United States Patent
Loher et al.

(10) Patent No.: US 7,051,603 B2
(45) Date of Patent: May 30, 2006

(54) FORCE TRANSDUCER, MOUNTING ARRANGEMENT FOR A FORCE TRANSDUCER, AND WEIGHING SCALE

(75) Inventors: Urs Loher, Nänikon (CH); Chandradeo Sawh, Spartanburg, SC (US); Jean-Maurice Tellenbach, Hettlingen (CH)

(73) Assignee: Metter-Toledo GmbH, Greifensee (CH)

( * ) Notice: Subject to any disclaimer, the term of this patent is extended or adjusted under 35 U.S.C. 154(b) by 0 days.

(21) Appl. No.: 10/943,037

(22) Filed: Sep. 17, 2004

(65) Prior Publication Data
US 2005/0081641 A1    Apr. 21, 2005

Related U.S. Application Data

(63) Continuation of application No. PCT/EP03/50048, filed on Mar. 10, 2003.

(30) Foreign Application Priority Data
Mar. 18, 2002 (EP) ................... 02100271

(51) Int. Cl.
*G01L 1/04* (2006.01)
(52) U.S. Cl. .................. 73/862.626; 73/856
(58) Field of Classification Search ........... 73/862.627, 73/856
See application file for complete search history.

(56) References Cited

U.S. PATENT DOCUMENTS

| | | | |
|---|---|---|---|
| 4,796,212 A | | 1/1989 | Kitagawa |
| 5,220,971 A | * | 6/1993 | Farr ............................ 177/229 |
| 5,756,943 A | | 5/1998 | Naito et al. |
| 5,841,077 A | | 11/1998 | Kolaci |
| 6,143,993 A | * | 11/2000 | Andersson ................... 177/229 |
| 6,225,576 B1 | * | 5/2001 | Poole et al. ................ 177/211 |
| 6,567,363 B1 | * | 5/2003 | Juman et al. ............... 720/631 |
| 6,694,829 B1 | * | 2/2004 | Chimura et al. ........ 73/862.627 |
| 2003/0227533 A1 | * | 12/2003 | Yokoi ......................... 347/156 |

FOREIGN PATENT DOCUMENTS

| | | |
|---|---|---|
| DE | 296 22 189 U1 | 4/1997 |
| DE | 198 36 317 A1 | 2/2000 |
| DE | 199 10 003 A1 | 9/2000 |
| DE | 199 39 633 A1 | 2/2001 |
| EP | 0 319 176 A2 | 6/1989 |

(Continued)

OTHER PUBLICATIONS

U. Tietze, Ch. Schenk, Halbleiterschaltungstechnik, 11th edition, first reprint, Springer Verlag, Berlin 1999, pp. 1242-1243.

(Continued)

*Primary Examiner*—Max Noori
(74) *Attorney, Agent, or Firm*—Buchanan Ingersoll PC (57) ABSTRACT

An exemplary mounting arrangement serves for the mounting of a force transducer that has a sensor-equipped core part connecting a support part to a force-application part. The support part can be bolted to a fastening part by mounting screws, and the force-application part can be bolted to a weighing pan carrier by means of mounting screws. The support part and the force-application part of the force transducer can each have a triplet of threaded holes serving to receive the mounting screws. Each triplet forms an isosceles triangle whose apex points towards the deformable body. The symmetry axes of the triangles lie in a plane that is parallel to the displacement travel of the force transducer. The mounting arrangement can be further configured to provide an effective overload protection in a low-profile design and to provide a thermally uncoupled fixation.

19 Claims, 4 Drawing Sheets

FOREIGN PATENT DOCUMENTS

| | | |
|---|---|---|
| EP | 0 511 521 A2 | 4/1992 |
| EP | 0 670 479 A1 | 9/1995 |
| EP | 0 702 220 A2 | 3/1996 |
| EP | 1 069 418 A1 | 1/2001 |
| EP | 1 113 249 A2 | 7/2001 |
| GB | 1 462 808 | 1/1977 |

OTHER PUBLICATIONS

Al Brendel, Overload Protection In Electronic Weighing Systems: Part 5, XP-002138047, Measurement and Control, Vo. 12, Nov. 1979, p. 471.

Copending U.S. Appl. No. 10/943,096 (BDSM Ref.: 032842-029) and corresponding EP Search Report PCT/EP 03/50050 dated May 21, 2003.

Copending U.S. Appl. No. 10/943,094 (BDSM Ref.: 032842-030)and corresponding EP Search Report PCT/EP 03/50049 dated May 30, 2003 and PCT Search Report PCT/EP 03/50049 dated Dec. 22, 2003.

EP Search Report PCT/EP 03/50048 dated Jul. 8, 2003.

* cited by examiner

FORCE TRANSDUCER, MOUNTING ARRANGEMENT FOR A FORCE TRANSDUCER, AND WEIGHING SCALE

CROSS REFERENCE TO RELATED APPLICATIONS

This application claims priority under 35 U.S.C. §119 to European Application No. 02100271.2 filed in the EP on 18 Mar. 2002, and as a continuation application under 35 U.S.C. §120 to PCT/EP03/50048 filed as an International Application on 10 Mar. 2003 designating the U.S., the entire contents of which are hereby incorporated by reference in their entireties.

BACKGROUND

A force transducer is disclosed, along with a way of fastening the force transducer, a mounting arrangement for a force transducer, as well as a weighing scale in which a force transducer is installed by means of a mounting arrangement.

Known force-measuring cells of weighing scales are equipped with a force transducer that is on one side connected to a scale housing serving as support base and on the other side to a weighing pan carrier through which the force to be measured is introduced. Force transducers can be configured in a variety of ways. Widely used are transducer designs with an elastically deformable body as a core element, or with a device that performs a force compensation, in most cases by means of a counterbalancing force which is generated by a current-regulated electromagnet and is acting through a lever mechanism.

To give an example, a force transducer described in [1], DE 199 39 633 A1 and referred to as "counterforce" or "force receiver" in [2], EP 0 670 479 A1, has an elastically deformable body connecting a housing-connected fixed part of the transducer to a force-application part or, in the case of a weighing scale, a weighing-load application part. The force transducer has transverse grooves at the transitions between the deformable body and the parts that serve to connect the force transducer to the scale housing and the weighing pan carrier. The transverse grooves serve to mechanically uncouple the deformable body in which the deformations effected by the applied forces are measured by means of sensors, such as strain gauges.

The deformable body can be configured as a parallelogram-shaped measuring element with an arrangement of guide members resembling a parallelogram (see for example [3], EP 0 511 521 A1).

The analog signal representing the measurement can be generated by means of strain gauges connected to each other in a bridge circuit. The signal is normally digitized in a converter circuit and subsequently put through further processing steps. The principal structure of a bridge circuit with strain gauges is described, e.g., in [4], U. Tietze, Ch. Schenk, Halbleiterschaltungstechnik, 11 th edition, first reprint, Springer Verlag, Berlin 1999, pages 1242–1243.

To support the further processing of the digitized measuring signal, the measuring cell described in [2] has a memory module in which characteristic parameters are stored that are specific to the individual measuring cell and are used to correct the measuring signals.

As described in [5], published patent application Ser. No. GB 1 462 808, the aforementioned correction applies in particular to errors that are caused by non-linearities, hysteresis phenomena, temperature and creep effects. The calibration- and compensation data required for the correction are determined during production at the factory through specific test and measuring procedures and are stored in the memory module.

According to [1], the measuring accuracy of force transducers in weighing cells depends to a significant degree on the hysteresis properties of the force transducer. The hysteresis of a force transducer can be caused by several factors that occur in most cases in combination with each other.

Further according to [1], mechanical design measures that have heretofore been used to lessen the hysteresis effects have been directed mainly at avoiding plastic deformations of the material of the force transducer. As a means of avoiding friction between the fixed housing-connected part of the force transducer and the mounting base to which it is connected, the two parts were securely bolted together, joined through contact surfaces finished to a high degree of planarity and cleaned of grease and other contaminations. To limit the hysteresis error of the scale, specific requirements are set for the machining of the contact surfaces and for the tightening torque of the screw bolts.

In the practical implementation of these requirements, it was found that the screw connection introduced variable amounts of stress in the material, with an additional unfavorable effect on the hysteresis.

As a solution, it was proposed in [1] to insert a shim element of a flat elastic seal material between the part of the force transducer that is installed in a fixed condition relative to the housing and the mounting base to which the fixed transducer part is connected. However, besides the cost of the seal material, the long-term behavior of the shim element is of concern in this solution. In some cases, a scale that is equipped with an elastic shim element may have to be recalibrated after a relatively short time period.

Furthermore, modern types of scales often have modular force-measuring cells that can be exchanged by a service technician at the user location without the need to send the scale to the factory. The use of an elastic shim element can hardly be recommended for these scales without a recalibration after the exchange of the force-measuring cell, because the behavior of the elastic shim element can change strongly with the exchange of the force-measuring cell.

SUMMARY

Exemplary embodiments of the present invention are directed to an improved mounting arrangement for a force transducer, a force transducer that is compatible with the mounting arrangement, as well as a scale with a force transducer that is mounted by means of the improved mounting arrangement. The term "mounting arrangement" in the present context encompasses the mechanical components which in their entirety serve to interconnect the force transducer between the part of the scale where the weighing load is introduced and the base that provides the counter-acting support force.

Exemplary embodiments provide a cost-effective mounting arrangement that allows a force transducer with sensors to be mounted in such a manner that the measuring characteristic is to a large extent linear and therefore leaves only small deviations to be compensated. In addition, the deviations from an ideal behavior that remain after the installation of the force transducer should change as little as possible over time.

An exemplary mounting arrangement allows force-measuring cells to be mounted in a scale housing within a small amount of space and with a high degree of stability.

An exemplary mounting arrangement protects the force-measuring cells reliably against overload.

In addition, the mounting arrangement can be suitable for mounting modular force-measuring cells that have to meet a requirement of being interchangeable without necessitating a recalibration of the scale.

An exemplary force transducer is configured with a force-application part and a support part that are connected through a core part. The core part has at least one sensor and may be mechanically uncoupled from the force-application part and/or the support part by means of transverse grooves. In accordance with an exemplary embodiment, the force transducer can be distinguished by a special arrangement of threaded bore holes that receive the fastening screws for the attachment of a load-receiving part to the force-application part of the force transducer as well as for the attachment of a fastening part to the support part of the force transducer. The attachment surfaces or contact zones for at least the fastening part, and in an exemplary embodiment, also for the load-receiving part, are each provided with three threaded bore holes that run parallel to each other in the direction of the force application. In the plane of the attachment surface, which is orthogonal to the threaded bore holes, the centers of the bore holes form an isosceles, (e.g., equilateral) triangle with its apex pointing towards the core part of the force transducer. With three threaded bore holes each on the force-application part and on the support part, the respective symmetry axes of the triangles run substantially parallel to each other and share the same plane as the direction of the force application.

Furthermore, the planes of the triangles themselves can be parallel to each other, so that the load will subject the force transducer only to bending, but not to torsion.

The mounting arrangement for a force transducer, in particular of the type that has just been described, can be distinguished by a fastening part with a U-shaped cross-section in which the open side of the U faces towards the force transducer. The fastening part extends from the attachment surface of the support part towards the force-application part, reaching beyond the middle of the core part, and includes means for installing the fastening part at a fixed position, for example screws, clamps, snap connectors, or similar fasteners. The installing means serve to attach the force-measuring cell to parts that are, for example, stationary, such as in particular a housing of a weighing scale. The fastening part can include means by which the fastening part can be screwed together with a force transducer of the aforementioned kind. The load-receiving part, which in the particular case of a weighing scale is also referred to as weighing pan support, can likewise be configured to be bolted to the force transducer in the same way as described above. However, this particular feature is not applicable, e.g., in a scale where the load is introduced from a suspended load through a hook that is screwed directly into the force-application part.

As a result of exemplary arrangements of the mounting screws described herein, the stresses that occur in the force transducer can be significantly reduced, so that there is no longer a need for using a shim element as described in [1].

A reduction of the measuring errors can be achieved even if an exemplary arrangement of the mounting screws on the force transducer is used on the fixed part alone or on the force-application part alone. However, there can be a further significant improvement if the arrangement of the mounting screws as described herein is used on both of these parts. It has further been found that the so-called recovery phenomenon can be drastically reduced. The term "recovery" in this context means a slow change of the stresses which occurs after the fastening connection has been tightened and which affects the creep behavior, hysteresis, and other deviations from an idealized behavior.

The aforedescribed benefits of using the disclosed arrangements of the mounting screws prove to be particularly advantageous in weighing scales equipped with modular force-measuring cells, i.e., measuring cells that are for example equipped with a force transducer, sensors, and a local electronic circuit, where a recalibration of the scale is to be avoided when replacing the measuring cell.

In an exemplary embodiment of the force transducer and the mounting arrangement, the distance between the two bore holes at the base corners of the isosceles triangle that is formed by the three bore holes is about twice as long as the distance of the bore holes from the border of the respective contact zone of the support part or the force-application part of the transducer. In the mounting arrangement, the support part can be connected to a fastening part which, in turn, can be appropriately anchored, for example in the housing of a scale. In exemplary applications of the force transducer, the support part is therefore a part of the force transducer that can be mounted at a fixed location of a housing. As a further feature of the mounting arrangement, the force-application part is connected to a load-receiving part. In the case of a scale, the load-receiving part is a weighing-pan carrier. When the force transducer is bolted to the fastening part and/or to the load-receiving part, the arrangement of the threaded bore holes described above can ensure a uniform stress distribution in the area of the contact zones.

The fastening part and the load-receiving part themselves can, for example, be as stiff as possible and should have means for installing the force transducer that is equipped with the mounting arrangement, for example in the housing of a scale. According to an exemplary feature, the fastening part as well as the load-receiving part can be therefore configured as support members with a U-shaped profile and outward-protruding ledges formed on the sides of the U-channels. The lateral ledges provide stiffness. In the case of the fastening part, the lateral ledges also offer a possibility for connecting the fastening part to the outside. They also allow an arrangement of an overload protection with a low overall installation profile. In addition, the U-shaped support members protect the force transducer in the handling of the module.

It is further known from [6], published patent application Ser. No. DE 199 10 003 A1, that force transducers and strain gauges can be highly sensitive components, that are easily destroyed by mechanical overload. The device described in [6] therefore has an adjustable end stop arranged above the housing-connected fixed part of the force transducer, which serves to limit the downward displacement of the weighing pan or weighing platform that is held by the weighing pan support. In modular force-measuring cells of the type described in [2], there is no advantageous way to realize this configuration of the overload safety device, which requires a relatively large amount of space in the vertical direction. Because of the way in which the weighing platform and the overload safety device are intended to work together, the design options for the scale are strongly restricted. In case the measuring cell is exchanged, the gap between the end stop and the weighing platform may have to be readjusted. Furthermore, in the device described in [6], the forces that the end stop and the weighing load apply to the weighing platform are not aligned in a common axis, so that after the end stop has been reached, a force component that is not constrained by the end stop can continue to act on the force transducer and have a detrimental influence on the elastic properties of the force transducer or even cause damage to the force transducer if the applied force is extreme and exerts an unfavorable torque.

The aforementioned drawbacks can be avoided in exemplary embodiments of the inventive mounting arrangement. To avoid overloading the sensor-equipped force transducer, the ledges on the profile walls of the load-receiving part and the fastening part can extend far enough towards each other that they overlap. In the overlapping area, there are mutually matched end stops arranged to prevent an excessive displacement travel of the force-application part in relation to the support part when the applied force is too large. For example, at least one laterally extending part of the weighing pan carrier or—in more general terms—of the load-receiving part is provided with a round hole through which a vertical bolt passes with clearance. Two nuts on the bolt are adjustable in such a manner that one of the nuts limits the downward displacement of the force-application part and the other of the two nuts limits the displacement travel in the upward direction. Other configurations of the end stops on the overlapping profile parts are possible as straightforward possibilities within the scope of the invention.

As the end stop acts directly on the weighing pan carrier, the overload safety device can be realized with a minimal requirement for extra space. Since the weighing platform or weighing pan is not cooperating directly with the overload safety device, the overload protection arrangement imposes no restrictions on the design of the scale.

The fastening part as well as the load-receiving part can be equipped on both sides with an end stop for both displacement directions. For example, the weighing pan carrier can have laterally projecting parts on both sides, each with a round hole through which a vertical bolt passes with clearance. Two nuts on each of the bolts are adjustable in such a manner that the two laterally projecting parts are met simultaneously by the nuts that form the downward or upward limit stop, respectively, so that a lateral twisting of the force transducer as well as hysteresis problems caused by the twisting action can be avoided.

The arrangement where the forces of the load on the weighing pan carrier are aligned along an axis sharing the same plane with the bolt axes of the overload safety device can prevent the risk that a load-dependent force component can continue to increase and adversely affect the force transducer after the overload stop has been reached on both sides.

The weighing pan carrier and the fastening part can be configured with a U-shaped cross-section with the open side of the U-channel facing towards the force transducer, so that the force transducer is partially surrounded by these parts, which have an increased stiffness due to their U-shape. The mounting arrangement with the measuring cell held inside it can therefore also be used in small balances that are subject to exacting precision requirements.

The ends of the U-profiled fastening part can be laterally extended into outward-bent wing portions that are provided with passage holes for mounting screws that can be screwed into support elements in the scale housing. The fastening part in this embodiment therefore serves at the same time to provide a firm hold on the force transducer, to realize a simple yet effective overload safety device, and to connect the entire measuring device to the scale housing. In contrast, solutions proposed in, e.g. [7], published patent application Ser. No. DE 198 36 317 A1, include an additional chassis for the connection of the measuring cell to the scale housing, for example a stamped sheet-metal part, which entails an increase in manufacturing cost and is installed in a commensurately larger scale housing.

A force transducer according to an exemplary embodiment can be therefore connected to a weighing pan carrier and a fastening part of the foregoing description. However, this is not meant to preclude the possible use of differently shaped weighing pan carriers and fastening parts.

BRIEF DESCRIPTION OF THE DRAWINGS

In the following, exemplary embodiments will be explained in more detail and with reference to drawings of an example of a force-measuring cell with a deformable body configured as a parallelogram-shaped measuring element with sensors. However, the example presented is not meant to impose limitations on the scope of the invention. The invention can also be used with other types of force-measuring cells. In the drawings.

DETAILED DESCRIPTION

Figure 1:
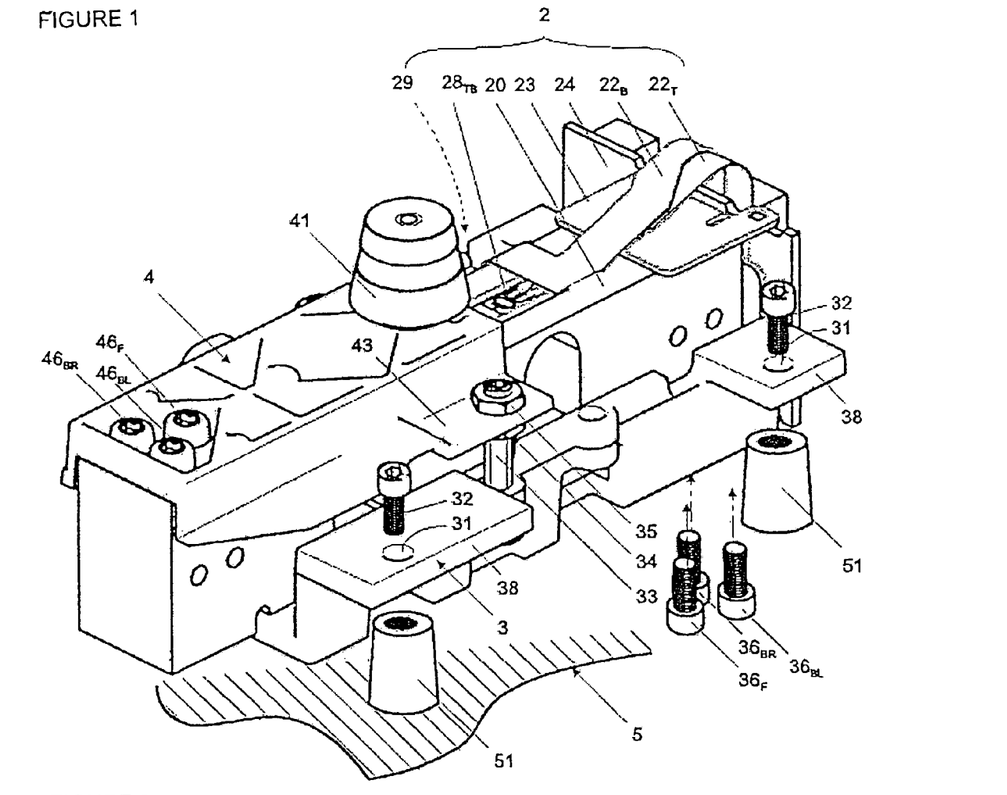
FIG. 1 illustrates an exemplary force transducer 20 installed by means of a mounting arrangement, wherein the force transducer together with the sensors 28, 29 and a circuit module 24 forms a modular force-measuring cell 2 that can be connected to a weighing pan carrier 4 serving to apply the force and to a scale housing 5 by means of a fastening part 3.
Figure 2:
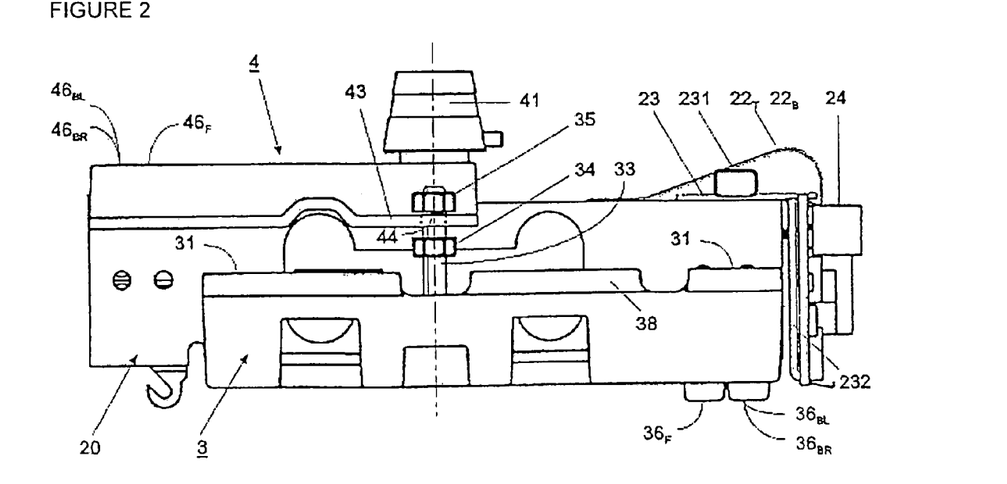
FIG. 2 shows a side view of the exemplary modular force-measuring cell 2 of FIG. 1.

FIGS. 1 and 2 illustrate an exemplary force transducer 20 that forms a modular force-measuring cell together with the sensors 28, 29 and is installed by means of a mounting arrangement according to an exemplary embodiment of the invention. The force transducer 20 is connected to a fastening part 3 by means of mounting screws $36_{BR}$, $36_{BL}$, $36_F$ and to a weighing pan carrier 4 by means of mounting screws $46_{BR}$, $46_{BL}$, $46_F$. The circuit module 24 is connected to the sensors 28, 29 by means of two separate flexible ribbon-like connectors $22_T$, $22_B$ and is held in place by an angle-shaped metal element 23 that is connected to the force transducer 20 by means of a screw 231 in a way that assures a good heat exchange between the circuit module 24 and the force transducer 20.

Figure 3:
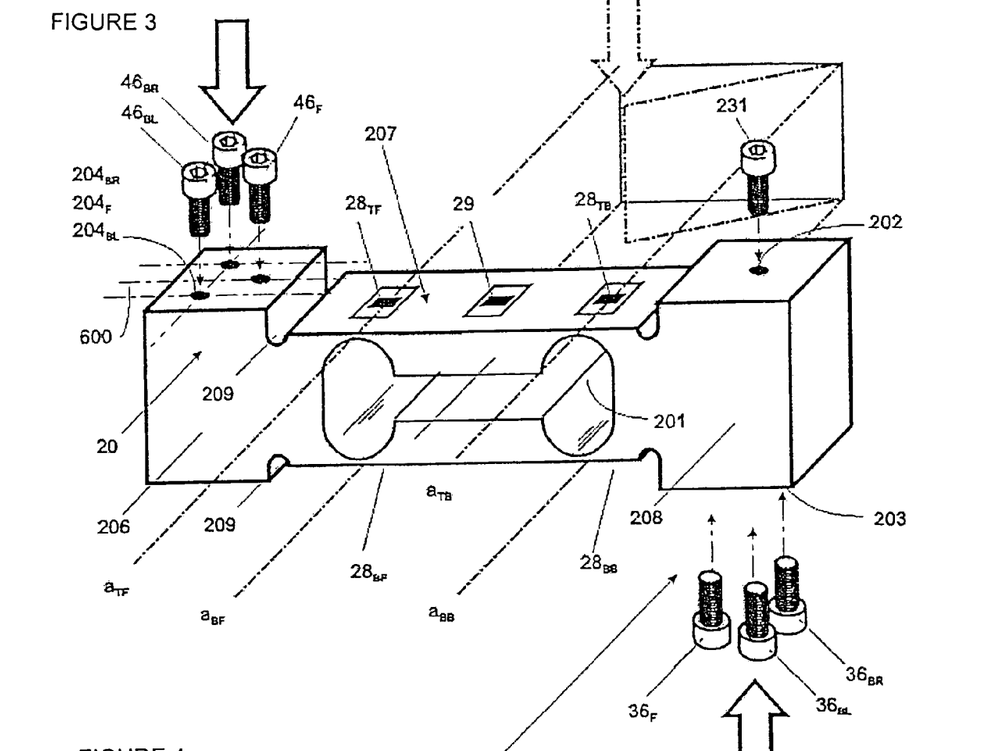
FIG. 3 illustrates the exemplary force transducer 20 of the modular force-measuring cell 2 of FIG. 1 with the screws $36_{BR}$, $36_{BL}$, $36_F$; $46_{BR}$, $46_{BL}$, $46_F$; 231 that serve, respectively, to attach the fastening part 3 which can in turn be connected to a scale housing, to attach the weighing pan carrier 4, and to attach a metal element serving to hold the circuit module.

The force transducer 20 that is shown in an exemplary embodiment in FIG. 3 has a deformable body 207 designed as a parallelogram-shaped measuring element connecting the support part 208, i.e., the part of the force transducer that is configured to be held in a fixed condition relative to a housing, to the force-application part, in this case the load-receiving part 206 of a weighing scale. To uncouple the stress field of the deformable body 207, the force transducer has transverse grooves 209 at the borders to the parts 208 and 206 that serve for the connection to the fastening part 3 and the weighing pan carrier 4. At the corners of the virtual parallelogram linkage formed by the measuring element, the part 207 has thin material portions where strain gauges $28_{TF}$, $28_{TB}$, $28_{BF}$, $28_{BB}$ are installed. The locations of maximum bending deformation at the thin material portions are indicated by the bending axes $a_{TB}$, $a_{TB}$, $a_{BF}$, $a_{BB}$ that extend perpendicular to the plane of the parallelogram. In addition, a temperature sensor 29 that is used for temperature compensation can be arranged on the top surface of the deformable body 207.

Figure 4:
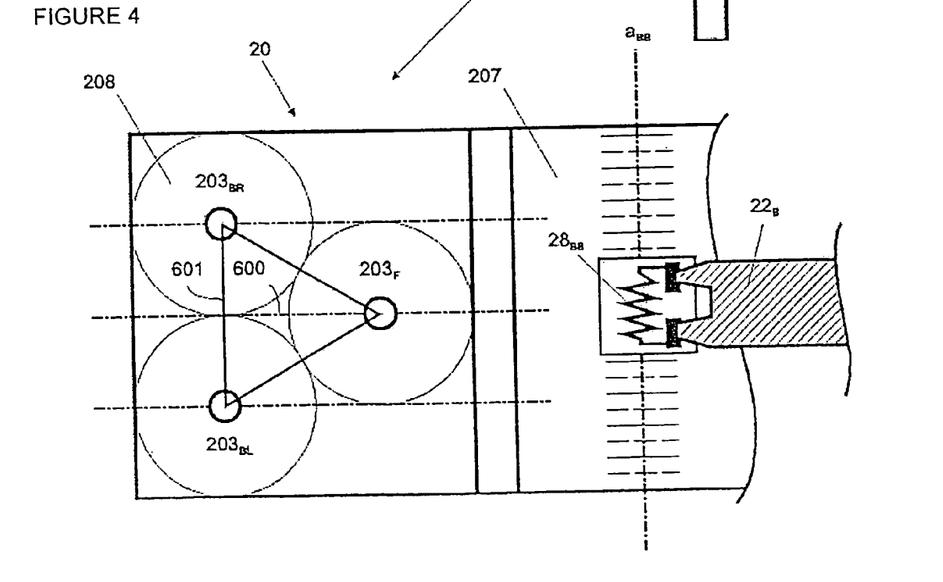
FIG. 4 illustrates the exemplary fixed part 208 of the force transducer 20 with the tapped holes $203_{BR}$, $203_{BL}$, $203_F$ that receive the mounting screws $36_{BR}$, $36_{BL}$, $36_F$ for the connection to the fastening part 3.

As shown in FIGS. 3 and 4, the part 208 that serves for the fixed installation of the transducer 20 in a housing and the force-application part 206 of the force transducer are provided with triplets of tapped holes $203_{BR}$, $203_{BL}$, $203_F$ and $204_{BR}$, $204_{BL}$, $204_F$, respectively, that run in the direction of the force application and serve to receive the mounting screws $36_{BR}$, $36_{BL}$, $36_F$ and $46_{BR}$, $46_{BL}$, $46_F$. In a plane that intersects the tapped holes orthogonally, the triplets of holes form isosceles triangles pointing towards the deformable body. The respective symmetry axes 600 of the triangles run parallel to each other and define at least approximately a first plane, with the displacement travel of the force transducer 20 occurring parallel to the first plane. Furthermore, the triangles themselves lie in mutually parallel planes that are at least approximately perpendicular to the first plane.

As a result of the exemplary arrangement of the mounting screws, the stresses as well as the long-term change of the stresses occurring in the force transducer 20, both of which have an unfavorable influence on the behavior of the transducer, can be significantly reduced.

In an exemplary embodiment, the distances between the tapped holes $203_{BR}$, $203_{BL}$, $203_F$ and between the tapped holes $204_{BR}$, $204_{BL}$, $204_F$ can be made approximately equal (e.g., ±a desired tolerance).

Furthermore, a desired stress distribution can be achieved in the force transducer 20 by selecting the respective distances between the tapped holes $203_{BR}$, $203_{BL}$ and between the tapped holes $204_{BR}$, $204_{BL}$ at the end of the baseline 601 of the isosceles triangle to be about twice as long as the distance of these holes from the border of the respective contact zone where the fixed support part 208 is connected to the fastening part 3 and where the force-application part 206 is connected to the weighing pan carrier 4 (see FIG. 4).

As discussed above, the force transducer 20 and the strain gauges $28_{TF}$, $28_{TB}$, $28_{BF}$, $28_{BB}$ (see FIG. 3) can be highly sensitive components that are easily destroyed by a mechanical overload. An exemplary embodiment of the invention demonstrates a simple way to realize an overload protection device which limits the upward and downward displacement travel of the force transducer 20 without allowing harmful torque reactions to occur on the force transducer.

Figure 5:
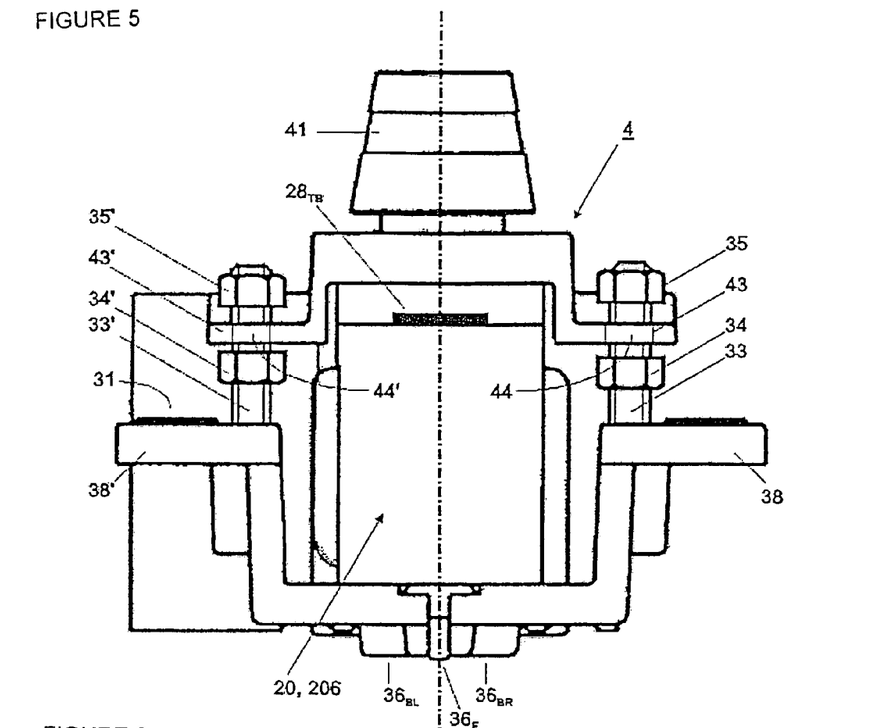
FIG. 5 shows the exemplary modular force-measuring cell 2 of FIG. 1 with the exemplary force-application part 206, seen from the front.

To implement an exemplary embodiment of the overload safety device, the U-profiled weighing pan carrier 4 can have lateral portions 43, 43' with holes 44, 44'. Bolts 33, 33' that are connected to the fastening part 3 pass with clearance through the holes 44, 44'. Two nuts 34, 35 on bolt 33 and two nuts 34', 35' on bolt 33' are adjustable in such a manner that the first nuts 34, 34' limit the downward displacement of the force-application part 206 of the force transducer 20 by constraining the lateral parts 43, 43', and the second nuts 35, 35' analogously limit the displacement travel in the upward direction.

As may be seen in FIG. 5, the overload protection device which is based on constraining the weighing pan carrier 4 directly through the upper and lower end stops formed by the nuts 35, 35' and 34, 34', respectively, can be realized with a minimal requirement for space. This can be of particular advantage in modular force-measuring cells 2, because a very compact design is preferred for these types of force-measuring cells.

The arrangement where the forces of the load on the weighing pan carrier 4 are aligned along an axis sharing the same plane with the axes 33, 33' of the bolts of the overload safety device prevents that a load-dependent force component can continue to increase and have a potentially damaging effect on the force transducer 20 after the overload stop has been reached on both sides. Further increases in load-related forces are therefore absorbed entirely by the overload protection device.

The fastening part 3 and the weighing pan carrier 4 can be configured with a U-shaped cross-section with the open side of the U-channel facing towards the force transducer 20, so that the force transducer 20 is partially surrounded by these parts, which have an increased stiffness due to their U-shape. The mounting arrangement with the measuring cell held inside it, and with the overload protection device as a design option, can therefore also be used in small balances that are subject to exacting precision requirements.

As shown in FIG. 1, the ends of the exemplary U-profiled fastening part are laterally extended into outward-bent wing portions 38, 38' that are provided with passage holes 31 for mounting screws 32 that can be screwed into support elements 51 in the scale housing 5. As an alternative to the screws 32, one could also use other fasteners such as clamps, snap mechanisms or similar devices. The support elements 51 can, for example, be made of an insulating material, so that the measuring cell 2 is thermally uncoupled from the scale housing 5 and from other modules arranged in the housing such as, e.g., a processor module 501.

The fastening part 3 in this embodiment therefore serves at the same time to provide a firm hold on the force transducer 20, to realize a simple yet effective overload safety device, and to connect the entire measuring device to the scale housing 5, where the latter may in some cases have a very compact volume. In addition, the exemplary arrangement provides a good thermal separation of the force measuring cell.

Figure 6:
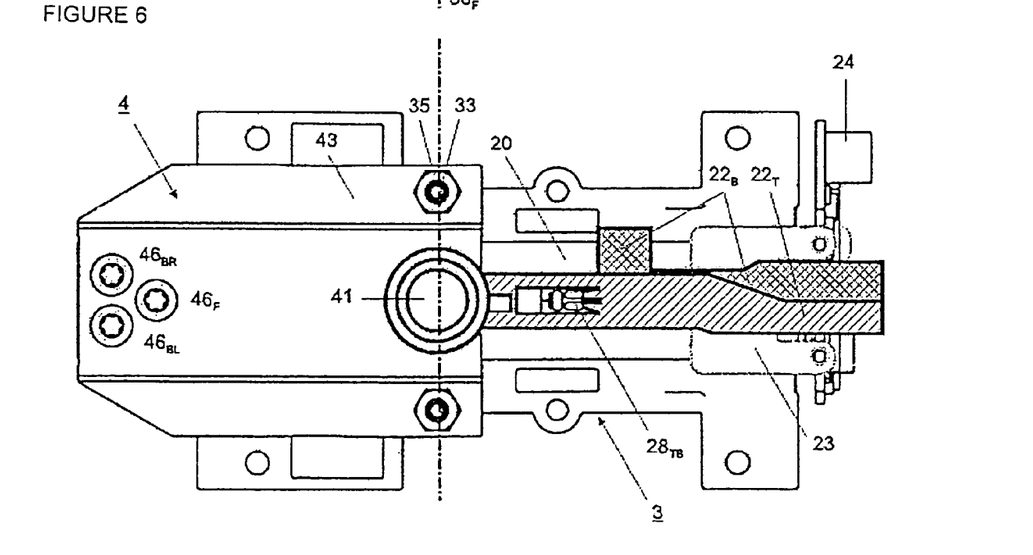
FIG. 6 illustrates the exemplary modular force-measuring cell 2 of FIG. 1 as seen from above with two ribbon connectors $22_T$, $22_B$, by which the circuit module 24 is connected to the sensors.

FIG. 6 illustrates the modular force-measuring cell 2 of FIG. 1 as seen from above with the two ribbon connectors $22_T$, $22_B$, by which the circuit module 24 is connected to the sensors $28_{TF}$, $28_{TB}$, $28_{BF}$, $28_{BB}$, 29. Also clearly shown are the arrangement of the mounting screws $46_{BR}$, $46_{BL}$, $46_F$ and the arrangement where the axes of the bolts 33, 33' and the conical seating peg 41 for the weighing pan share the same plane.

Figure 7:
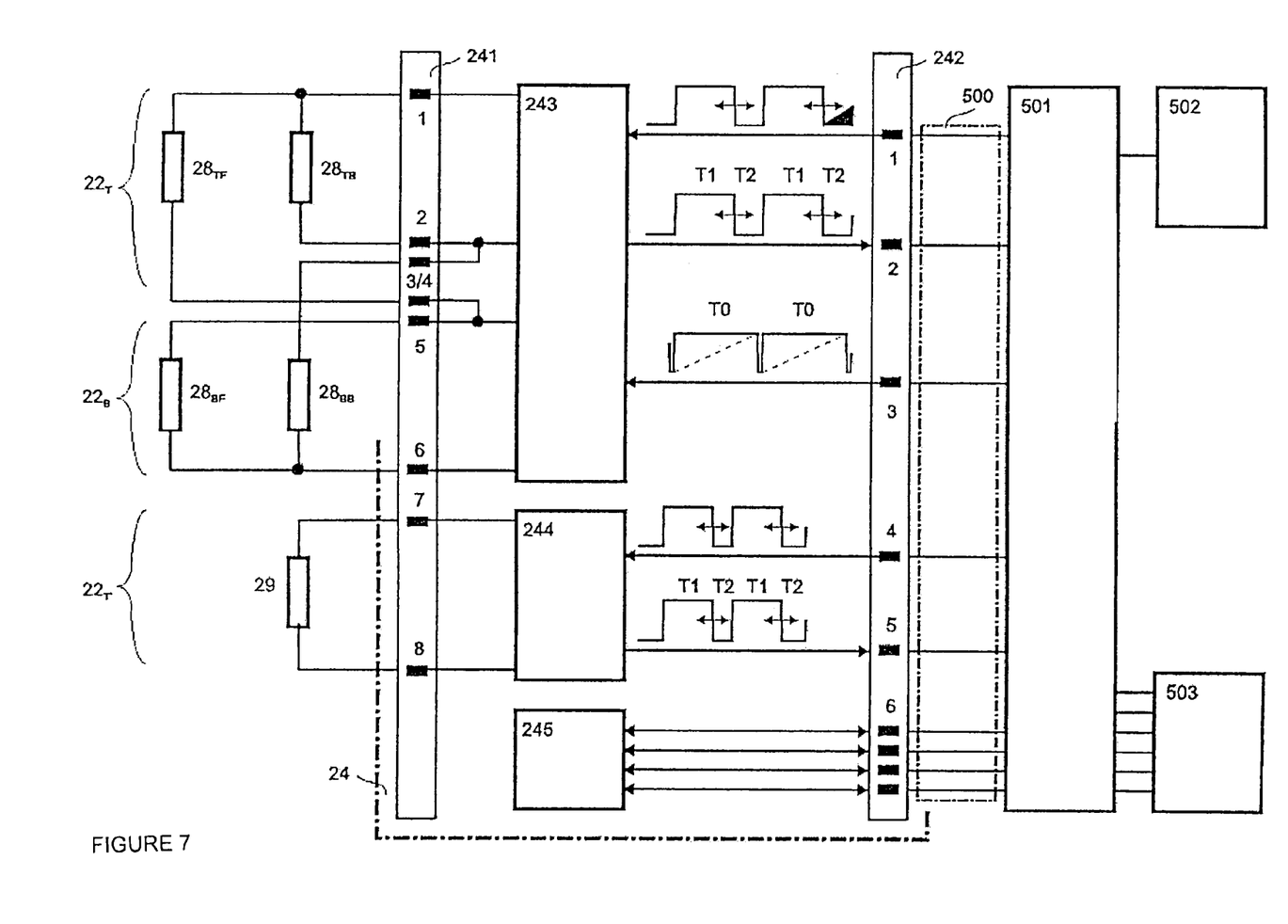
FIG. 7 schematically represents the modular structure of an exemplary circuit module 24 that is connected to the sensors $28_{TF}$, $28_{TB}$, $28_{BF}$, $28_{BB}$, 29 through the ribbon connectors $22_T$, $22_T'$, $22_B$ and to a processor module 501 through the further ribbon connector 500.

FIG. 7 schematically represents the modular structure of an exemplary circuit module 24 that is connected to the strain gauges $28_{TF}$, $28_{TB}$, $28_{BF}$, $28_{BB}$ and the temperature sensor 29 through the terminal strip 241 and ribbon connectors $22_T$, $22_{T'}$, $22_B$ and to a processor module 501 through the terminal strip 242 and a further ribbon connector 500. The processor module, in turn, is connected to a display 502 and an interface module 503. The processor module 501 is arranged inside the scale with a separation from the circuit module 24, so as to avoid thermal coupling between the two modules. Thus, the heat generated by the processor module 501 has no influence on the modular force-measuring cell 2 according to an exemplary embodiment of the invention.

The circuit module 24 includes, for example, two converter circuits 243, 244. The first converter circuit 243 converts the analog signals of the strain gauge bridge circuit $28_{TF}$, $28_{TB}$, $28_{BF}$, $28_{BB}$ into bi-level, pulse-width modulated signals pwm1, while the second converter circuit 244 converts the analog signals of the temperature sensor 29 into bi-level, pulse-width modulated signals pwm2. The signals pwm1, pwm2 are sent through the ribbon connector 500 to the processor module 501, where the signals are further processed by means of compensation data that can be available for recall from a memory module 245 that is likewise arranged on the circuit module 24.

It is considered self-evident that the mounting arrangement according to an exemplary embodiment of the invention can be used regardless of the specific configuration of the electronic measuring circuit and the further configuration of the measuring cell. In particular, there are applications where the mounting arrangement can be used to mount measuring cells that are not of a modular design and to mount force transducers with different kinds of sensors in order to achieve a good degree of mechanical uncoupling.

The disclosures of documents [1]–[7], referenced herein, are hereby incorporated by reference in their entireties.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A mounting arrangement for a force transducer comprising:
  a force transducer comprising a force-application part, a support and a core part;
  a load-receiving part connected to the force-application part through a first attachment surface;
  a fastening part connected to the support part through a second attachment surface, the fastening part having a U-shaped cross-section with an open side of its U-profile facing towards the force transducer, the fastening part extending from the second attachment surface towards the force-application part over a middle of the core part; and
  means on the fastening part for fixation of the fastening part.

2. The mounting arrangement for a force transducer of claim 1, wherein the core part which lies between the force-application part and the support part, decoupled by grooves from the force-application part and the support part, and equipped with at least one sensor, wherein at least the support part has three threaded holes running in a direction of a force application and serving to receive mounting screws, and wherein in a plane that intersects the holes orthogonally, centers of the threaded holes form an isosceles triangle whose apex points towards the core part.

3. The mounting arrangement for a force transducer according to claim 2, wherein distances between the three threaded holes are at least approximately equal.

4. The mounting arrangement for a force transducer according to claim 2, wherein a distance between the centers of the threaded holes forming a baseline of the isosceles triangle is approximately twice as long as a distance of the centers of the threaded holes from a border of an attachment surface of the threaded holes.

5. The mounting arrangement for a force transducer according to claim 2, wherein the core part comprises:
  a deformable body configured as a parallelogram-shaped measuring element that guides the force-application part in a parallel translatory motion relative to the support part, wherein the at least one sensor is a strain gauge installed in a deformation zone of the deformable body.

6. The mounting arrangement for a force transducer according to claim 2, comprising:
  a circuit module mechanically and thermally coupled to the force transducer, wherein the circuit module includes a memory module as well as at least one converter circuit for conversion of analog signals produced by the sensor of the force transducer.

7. The mounting arrangement for a force transducer according to claim 2, wherein the support part and the force-application part each have three threaded holes running in the direction of the force application and serving to receive mounting screws, and wherein in a plane that intersects the holes orthogonally, centers of the threaded holes form isosceles triangles whose apices point towards the core part and whose symmetry axes are substantially parallel to each other and coplanar with the direction of the force application.

8. The mounting arrangement according to claim 1, wherein the means for fixation have a relatively low thermal conductivity.

9. The mounting arrangement according to claim 1, wherein the fastening part has wing portions configured as lengthwise lateral ledges that are gripped by the means for fixation of the fastening part.

10. The mounting arrangement according to claim 1, wherein the load-receiving part has a U-shaped cross-section with an open side of its U-profile facing towards the force transducer, the load-receiving part extending from the first attachment surface of the force transducer towards the support part into an area of the fastening part, and wherein the load-receiving part contains at least one device that cooperates with the fastening part to form an end stop for a displacement travel of the load-receiving part relative to the fastening part.

11. The mounting arrangement according to claim 10, wherein the load-receiving part has lateral parts configured as lengthwise lateral ledges, wherein at least one of the lateral parts has a hole through which a bolt that is connected to the fastening part passes with clearance, and wherein the bolt is provided with a first and/or second threaded nut that is adjustable in such a manner that a displacement travel of the force-application part of the force transducer is limited in a downward direction by the first nut and/or in an upward direction by the second nut.

12. The mounting arrangement according to claim 11, wherein the load-receiving part has lateral parts on each side, at the same distance, each with a hole through which a bolt that is connected to the fastening part passes with clearance, and wherein each of the bolts is provided with two threaded nuts that are adjustable in such a manner that the two lateral parts are in a downward direction stopped simultaneously by one nut on each side and in an upward direction simultaneously by the other nut on each side.

13. The mounting arrangement according to claim 12, wherein a line of action of forces acting on the load-application part and axes of the bolts run in a plane that is orthogonal to a longitudinal direction of the force transducer.

14. A scale with a mounting arrangement according to claim 12.

15. A weighing scale with a force transducer mounting arrangement according to claim 1, wherein the force application part is attached to a load receiving part configured as a weighing pan carrier, and the support part is attached with a fastening part used to fasten the force transducer to the weighing scale.

16. Force transducer The mounting arrangement for a force transducer according to claim 7, wherein distances between the three threaded holes are at least approximately equal.

17. The mounting arrangement for a force transducer according to claim 16, wherein a distance between the centers of the threaded holes forming a baseline of the isosceles triangle is approximately twice as long as a distance of the centers of the threaded holes from a border of an attachment surface of the threaded holes.

18. The mounting arrangement for a force transducer according to claim 17, wherein the core part comprises:

a deformable body configured as a parallelogram-shaped measuring element that guides the force-application part in a parallel translatory motion relative to the support part, wherein the at least one sensor is a strain gauge installed in a deformation zone of the deformable body.

19. The mounting arrangement for a force transducer according to claim 18, comprising:

a circuit module mechanically and thermally coupled to the force transducer, wherein the circuit module includes a memory module as well as at least one converter circuit for conversion of analog signals produced by the sensor of the force transducer.

* * * * *